Patented July 19, 1932

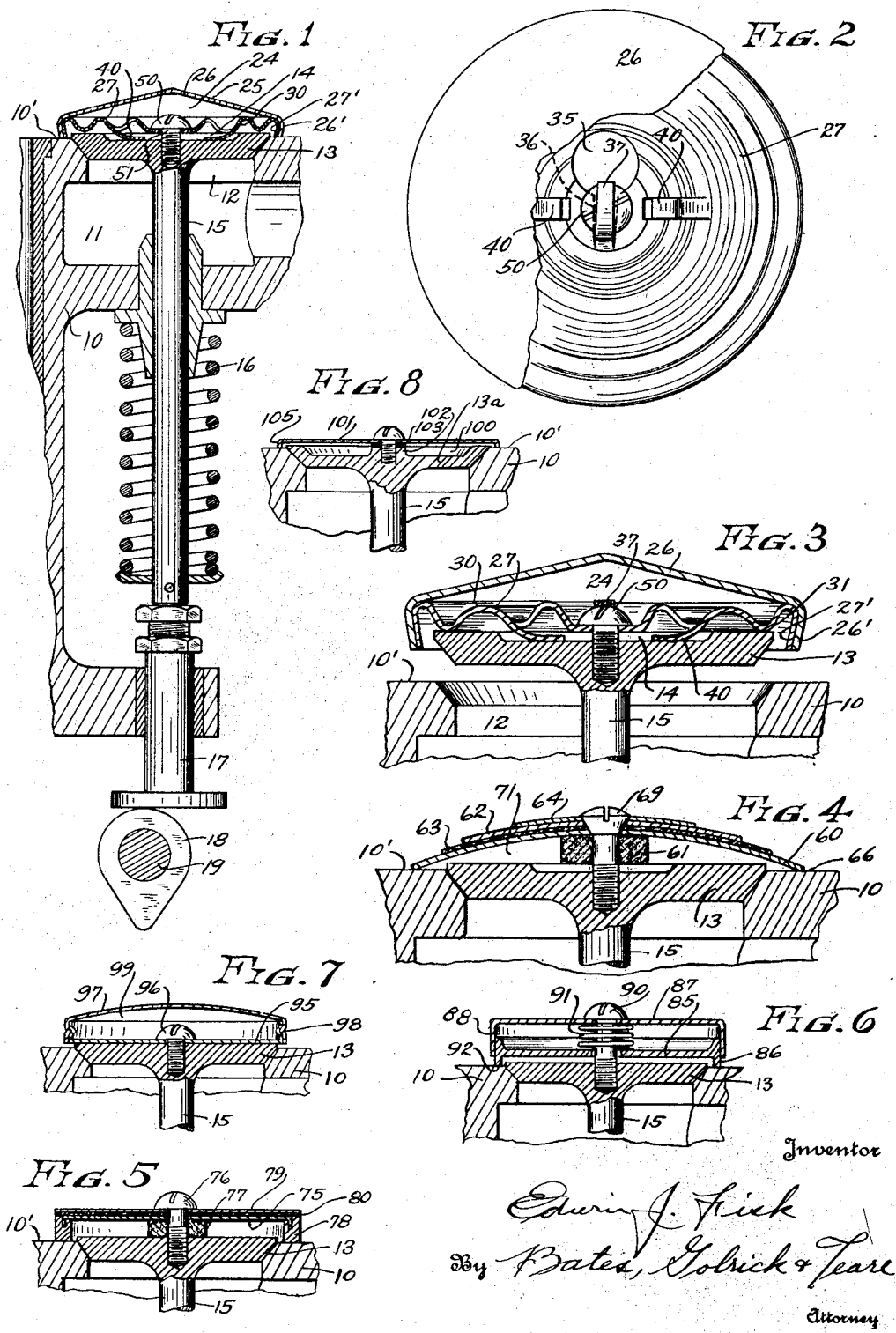

1,868,138

UNITED STATES PATENT OFFICE

EDWIN J. FISK, OF CLEVELAND, OHIO

POPPET VALVE

Application filed April 10, 1930. Serial No. 443,078.

This invention relates to valves of the type employed in internal combustion engines and explosive motors for use in automobiles and the like. The invention embodies a device mounted on or incorporated with the head of the valve to its advantage, and which device will increase the efficiency of the entire engine.

This device, as shown, is in the form of a special cap which is preferably so constructed as to facilitate its mounting and replacement on existing valves without requiring any modification of the general design of such valves. One of the objects of the invention is to provide a device in connection with a valve for an internal combustion engine, which device will check the flow of burnt gases through the exhaust port, slightly before the valve has completely sealed, inclosing, thereby substantially eliminating the possibility of the seating surface of the valve catching any foreign matter or particles of carbon enroute thru the exhaust port and embedding it in the valve or the seat therefor.

Another object of the invention is to provide a heat insulating cap adapted to be mounted on the head of a poppet valve, which cap will protect the entire valve structure against any distortion or warping out of its original shape by an internal or external stress or strain. Such stresses and strains are frequently set up in the valves, by reason of the valve head coming into direct contact with the intense heat of the explosion, the stem portion being comparatively cool because of its protected position.

It is obvious that the valve, even though guarded by my improved arrangement, will be subjected to more or less heat while in use, but this will largely comprise heat conducted by the engine parts coming in direct contact with the valve, and will be comparatively uniform; that is, it will not vary enough to materially affect either the function or the metallurgic structure of the valve.

Still another object of this invention is to provide a valve protecting device, including a cap or shroud, mounted directly over and completely covering the head of said valve, the valve to seat as ordinarily, yet which will, of itself, effect a seal or closure for the port in addition to that afforded by the valve per se.

In the forms of the invention shown, the cap embodies a flexibility that will permit it to seat properly even though the valve should fail to do so, yet at the same time it offers practically no resistance to the normal seating of the valve, permitting the latter to seat properly, should the cap fail to do so, thereby insuring a perfect seal against leakage at all times.

The preferred arrangements for carrying out the above objects will be fully set forth in the following detailed description relating to the accompanying drawing. The essential characteristics of the invention will be summarized in the claims.

In the drawing, Fig. 1 is a vertical section through a portion of an engine at one of the valves, and showing one embodiment of my invention in operative position. This view shows the valve in the closed position, likewise the cap; Fig. 2 is a plan view of the cap; a portion being broken away to show a suitable means for fastening the cap to the valve; Fig. 3 is an enlarged view of the cap and valve head in cross section in accordance with the line 3—3 on Fig. 2. This figure shows the valve in the open position. Figs. 4, 5, 6, 7 and 8 are vertical sectional views of modified forms which will be explained more in detail hereinafter.

The drawing shows, in a general way, a portion of an internal combustion engine block 10 formed to provide a gas receiving chamber 11 communicating through the usual valve opening or port 12 with the usual combustion chamber, the lower surface of which is indicated at 10'. A valve 13, normally closed, as by a spring 16 encircling the valve stem 15, is mounted in the cylinder block 10 and may be operated through a tappet 17 by a cam 18 on the usual cam shaft 19. The present invention resides primarily in the cap indicated, in Fig. 1, generally at 25, surmounting the valve 15. The cap 25, as shown, comprises a rigid disc member 26, and a resilient disc 27 held in place on the valve by means of a screw 50. The disc 26, as shown, is dome-shaped to add materially to its strength, but it does not necessarily have to be so shaped. It is also designed to grip the disc 27 at its periphery, as by reason of a depending, inwardly directed flange 26', combining the two discs into one unit. Both discs, 26 and 27, are preferably formed by the usual punch and die process and can be joined by means of a stamping die that will bend the flange of the disc 26 to conform to the slight downwardly converging shape of a flange 27' on the disc 27. These flanges 26' and 27' of the two discs 26 and 27 constitute a continuous skirt, the lower edge of which engages the surface 10' of the block as shown.

When the discs 26 and 27 are assembled, as described, a dead air space or compartment 24 will be formed, which will protect the disc 27 from considerable heat, thereby preventing such heat from drawing the temper of the disc 27, insuring its continued resiliency, and will of course protect the valve 15 from the intense heat that the entire assembly will be subjected to, when in use.

The disc 27 is formed preferably of a metal having a high resilient quality, and may be provided with corrugations to add to the resiliency of the disc. These are indicated generally at 30 and are preferably concentric with the periphery of the disc. The corrugations may be variously shaped and spaced.

The disc 27 is provided with an opening indicated at 35 to permit entrance of the head of a screw 50, the latter being suitably threaded into the valve head. The opening 35 is keyhole-shaped, and narrows at 36 to permit the opening in the disc 27 to fit snugly around the body 51 of the screw. The disc 27 has two tongue or projection members 40, that may be bent downwardly from the metal of the disc so as to spring into the usual slot 14 in the valve head when the unit 25 is slid into place on the valve head. The opening 36 in the disc 27 may be provided with a tongue member 37 arranged to bear downwardly on the screw 50, preventing it from turning relative to the valve head and becoming loose.

The disc 27, as shown, is supported by the outer edge of the valve head as indicated at 31, so that the entire unit 25 will be positively lifted on the upward movement of the valve 15. As shown, one of the corrugations 30 provides the necessary abutment. The support 31 will also help to keep carbon from collecting between disc 27 and valve head 13, by closing the space just above the head, when the valve is lifted.

The modified form of cap shown in Fig. 4 comprises a flexible metal disc, indicated at 60, separated from the valve head 13 and supported by a suitable heat insulating washer 61. The disc 60 is surmounted by another flexible disc 62. Interposed between the discs 60 and 62 is another disc 63 of flexible heat insulating material, such, for example, as gasket asbestos with wire netting for reinforcement. Surmounting the whole is another disc 64 of smaller diameter, arranged to add to the strength of the central portion of the assembled unit by reinforcing the central portion. The disc 60 is shaped in such manner that it provides an air pocket 71 over the valve head when mounted on the valve. The discs 62, 63 and 64 are, of course, made to conform generally to the shape of the disc 60. The entire unit is shown as held in place on the valve by means of a suitable screw 69. Any suitable means may be used to lock the screw in place.

The arcuate shape of the form of cap shown in Fig. 4 permits the edge 66 to come in contact with the engine block 10, when the valve 15 is in the closed position shown. The force of the explosion taking place in the combustion chamber of the engine will exert a certain amount of pressure upon the entire arcuate surface of this cap, thereby insuring a perfect seal between the edge 66 and the engine block, even though the heat of repeated explosions draws some of the temper from the metal discs and/or slightly warps them.

The modified form shown, Fig. 5, comprises a flexible metal disc 75 mounted on the valve head 13, as by means of a screw 76. Separating the central portion of disc 75 from the valve head 13 is a heat insulating washer 77. Separating the peripheral edge of disc 75 from engine block is a ring 78 of suitable metal to provide high wearing quality. The ring 78 may be fastened rigidly, by any suitable means to the disc 75. Surmounting the disc 75 and ring 78 is another flexible disc 79 also underlying the screw head. Interposed between the discs 75 and 79 is a disc 80 of suitable heat resisting material, asbestos for example.

A modification of this invention, employing a means to obtain flexibility independently of the materials forming the cap, but operating in conjunction with it, is shown in Fig. 6.

In this figure, the valve head 13 is shown surmounted by a rigid disc 85 having a peripheral surface of considerable vertical extent, indicated at 86. Mounted directly over, and covering the disc 85, is another substantially rigid disc 87, the latter having a skirt 88 in sliding peripheral contact with the surface 86. The two discs may be held on the head by a suitable screw 90. The lower disc slides freely on the screw and is arranged to be forced downwardly by a coil spring 91 which, as shown, obviously acts to separate the two discs, causing the lower edge 92 of the disc 85 to exert a predetermined seating force upon the block 10, when the valve is in the closed position. When the valve is in the process of closing, this lower edge of the disc 86 will seat upon engine block 10 slightly before the valve has seated.

Still another modification of the invention is shown in Fig. 7. This modification limits the capacity of the device to a cooling guard or cap for the valve head. In the form shown, a rigid cup-shaped disc 95 is mounted on the valve head 13, as by means of a suitable screw 96. A rigid cover disc or cap 97 is mounted over the disc 95 and held in place by any suitable means at its periphery. One such fastening means is indicated at 98, comprising suitable mutually embracing annular bead formations on both discs. The two members, 95 and 97, when assembled, for example as indicated, form a closed compartment 99 which can be employed for holding any suitable heat resisting material, such as asbestos, for example, or may contain only dead air, which is, of course, more or less effective as a heat insulator, being a poor heat conductor as compared to metals.

It will be noted that Fig. 4, for example, affords a heat insulating substantially dead air space between the cap and valve head, the head becoming the bottom wall for the air space. I mention this at this point, because it would be possible in the form of device illustrated by Fig. 7, to utilize the valve head as part of a double wall dead air container or space for insulating material.

In addition to the advantages above given for the device, the forms thereof shown in Figs. 1 to 6, for example, afford a further advantage in that the valve closing impact is cushioned by the cap coming into yielding contact with the engine head surface 10' just before the valve 13 seats. This obviously saves considerable wear on the coacting seat surfaces, both on the block and valve.

Fig. 8 shows a still further modification of the invention in which the valve head 13a is modified to form an enlarged central depression which cooperates with a comparatively flat cap member 101 to provide a heat insulation space for protecting the valve. The cap may be supported by a central boss 102 and insulating washer 103. The cap member may have a bead or flange 105 at its outer edge to make contact with the engine block 10, preferably leaving a space between the cap and the top surface at the outer rim of the valve head. This form has a special advantage in that it does not decrease the capacity of the combustion chamber or disturb the continuity of the wall surfaces.

While my invention is shown in connection with the usual poppet type of valve, it is to be understood that insofar as the novel arrangements and/or principles herein demonstrated may apply, I contemplate using the invention with other types of valves as well. It may be well to note further that, while the devices shown are particularly advantageous in connection with the exhaust valves of an engine, most of these advantages hold true with relation to the intake valves. The protection afforded by my device against working the valves by direct contact with the explosion flame is just as important at the intake as at the exhaust. In the use of practically all forms shown, the devices used on the intake valves will be found to materially assist in fully vaporizing the fuel by presenting hot irregular surfaces thereto.

I claim:

1. In combination with a valve for an internal combustion engine, the valve having a head and a stem, means mounted on the valve overlying the head and providing a continuous skirt lying outwardly from the seat of the head, to effect a closure in cooperation with the valve head.

2. In combination with a valve for an internal combustion engine, said valve having a head, a resilient disc, mounted over the head, and a second disc overlying the resilient disc and secured to the latter, one of the discs having a continuous skirt portion adapted to cooperate with the interior surface of the combustion chamber to effect a closure for the chamber in addition to the usual closure afforded by the valve.

3. In an internal combustion engine, means forming a combustion chamber and incorporating the usual valve aperture and valve, means to operate the valve, and a device surmounting the valve within the chamber, said device having a portion thereof adapted to seat on the interior surface of the chamber as an auxiliary valve or closure member for the aperture, and being operated by the valve operating means through the intermediacy of the valve to open the chamber after said valve has opened and to close the chamber before the valve closes.

4. In combination, in an internal combustion engine, a valve having a head, a yielding cap member, the central portion thereof being fixed to the head centrally thereof and having an outwardly extending portion adapted to engage and be supported by the interior surface of the combustion chamber to thereby insulate the valve from the heat of the chamber while the valve is closed, the member being arranged to be raised from the aforesaid contact by the said valve head when the latter is being raised to open the chamber.

5. In an internal combustion engine, a valve having a main seating surface and an auxiliary seating surface, the auxiliary seating surface being adapted to seat before the main seating surface and to unseat after the main seating surface unseats.

6. As a new article of manufacture, a poppet valve having two seating surfaces, one surface being adapted to seat before the other and to unseat after the other.

7. In a poppet valve for an internal combustion engine, a main body including a head and stem, the head being recessed, and there being a metallic plate mounted on the head, substantially in the plane of the head and of less thickness than the metal of the head, and forming with said recess an insulation space to protect portions of the said body from explosion heat in the combustion chamber of the engine.

8. A poppet valve including an integral head and stem, the head being recessed on its top side, and there being a relatively thin metal plate mounted on the head substantially in the plane thereof and covering the recess.

9. A poppet valve for an internal combustion engine, comprising a head and stem, the head being recessed on the side thereof opposite the stem and a relatively thin metal plate substantially in the plane of the head and secured to the valve and forming, with the recess of the head, a heat insulating space.

10. A poppet valve comprising a stem and a head, a recess in said head confined substantially thereto and a metal plate of less thickness than the wall thickness of the head, secured to the valve and covering said recess.

In testimony whereof, I hereunto affix my signature.

EDWIN J. FISK.